United States Patent [19]

Kasama et al.

[11] 4,378,997
[45] Apr. 5, 1983

[54] HYDRATION-EXPANSIVE CRUSHING CARTRIDGE

[75] Inventors: Tsuneo Kasama; Takao Saito; Makoto Wada, all of Kawagoe, Japan

[73] Assignee: Nippon Oil and Fats Co., Ltd., Tokyo, Japan

[21] Appl. No.: 315,574

[22] Filed: Oct. 27, 1981

[30] Foreign Application Priority Data

Oct. 27, 1980 [JP] Japan .................... 55-149360

[51] Int. Cl.$^3$ ............................................. C04B 7/02
[52] U.S. Cl. .................................. 106/89; 106/97; 106/98; 106/104; 206/119; 206/524.1; 206/525; 405/258; 405/259; 405/260; 405/261; 405/263; 405/266
[58] Field of Search ............... 106/85, 89, 97, 98, 106/104, 118, 120; 206/219, 524.1, 524.6, 524.7, 525; 405/258–261, 263, 266

[56] References Cited

U.S. PATENT DOCUMENTS 3,884,710 5/1975 Allen et al. .................... 106/118
4,096,944 6/1978 Simpson ........................... 106/90

*Primary Examiner*—James Poer
*Attorney, Agent, or Firm*—Flynn, Thiel, Boutell & Tanis

[57] ABSTRACT

A hydration-expansive crushing cartridge which is prepared by filling a hydration-expansive crushing agent into a container made of a material which allows the permeation or penetration of water and which can be broken by an external force. The cartridge can be charged into holes bored in a concrete structure, a rock bed or the like to crack it regardless of the positioning or the direction of the bored holes and which has a homogeneous crushing capability.

10 Claims, 5 Drawing Figures

HYDRATION-EXPANSIVE CRUSHING CARTRIDGE

This invention relates to a hydration-expansive crushing cartridge used for cracking a concrete structure, a rock bed or the like.

Hitherto, a process has been known in which a hydraulic crushing agent is used for crushing a concrete structure, a rock bed or the like. The process comprises first boring holes of a proper dimension in the concrete structure, the rock bed or the like to be crushed, then blending a hydration-expansive crushing agent with water, pouring the resulting blended mixture into the holes and effecting a hydration-expansion of the hydraulic crushing agent to generate cracks due to the expansion pressure of the hydration-expansion in the concrete, the rock bed or the like.

However, this crushing process has drawbacks as follows.

First, the charging of the hydration-expansive crushing agent blended with water cannot be applicable to an upwardly or horizontally bored hole.

Second, the time after the preparation of the blended product and before the charging of same into the holes is not constant since the blending is carried out in a batch system, while the hydration-expansive crushing agent is hydrated with expansion and curing depending on the time after the blending. This results in that a constant capacity can hardly be secured in the blended product of the hydration-expansive crushing agent and water.

SUMMARY OF THE INVENTION

A main object of this invention is to provide a hydration-expansive crushing cartridge which can be charged into holes bored in a concrete structure, a rock bed or the like to crush it regardless of the positioning or the direction of the bored holes and which has a homogeneous crushing capability.

This invention is based on the findings that a product prepared by filling a hydration-expansive crushing agent into a container made of a material which allows the permeation or penetration of water and which can be broken by an external force can be used to attain the objects of this invention.

An essential feature of this invention is a hydration-expansive crushing cartridge prepared by charging a hydration-expansive crushing agent into a container made so as to allow the permeation or penetration of water and which is easily broken by an external force. As for the hydration-expansive crushing agent, there is mentioned a cement which is hydrated to chemically or physically cause an expansion in a proper time when it is mixed with water. For example, a $CaO\text{-}SO_3\text{-}Al_2O_3$ series expansive cement, an expansive cement comprising (A) MgO, CaO (60–80% by weight), (B) CaO, $SiO_2$ (20–30% by weight) and (C) $CaSO_4$, $K_2SiF_6$ (5–10% by weight) and the like are exemplified.

For the container, there is used a material such as paper, an artificial paper, plastic film or the like, into which water easily penetrates when the hydration-expansive crushing cartridge of this invention is immersed in water and which can be easily broken after the hydration-expansive crushing cartridge is charged into a hole provided in the concrete structure, the rock bed or the like. The container may be provided with small openings on the outer face when desired.

When the above stated bored holes are much deeper and the corresponding hydration-expansive cartridges are much longer, a net made of plastic which is easily broken or a metal net formed in such a manner as its junction parts are easily separated, so as to adapt it to use as the container, may be inserted into or may cover the container on the outer face for the purpose of providing easy charging of the container into the hole and of strengthening the container.

Embodiments of this invention are explained with reference to the drawings.

Figure 1A:
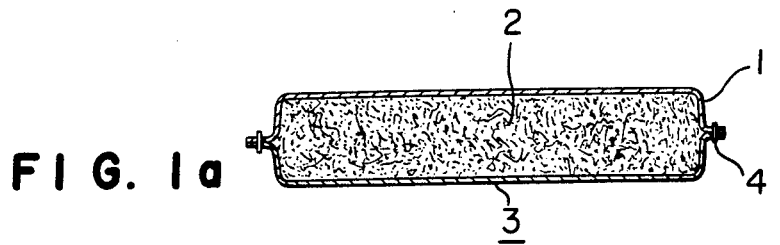
FIG. 1a is a cross sectional view of an embodiment of the hydration-expansive crushing cartridge of this invention.

In FIG. 1a, 1 designates the container, 2 designates the hydration-expansive crushing agent and 3 identifies the hydration-expansive cartridge composed of them.

When the hydration-expansive crushing agent 2 is to be contacted with water, the hydration-expansive crushing cartridge 3 of FIG. 1a is immersed in water, to effect the penetration of water through a number of openings provided on the outer face of the container 1 or the permeation through the container 1, thereby contacting the water with the hydration-expansive crushing agent 2.

The cartridge 3 is charged into the hole of a body to be crushed after it is contacted for a proper time in this manner.

Figure 1B:
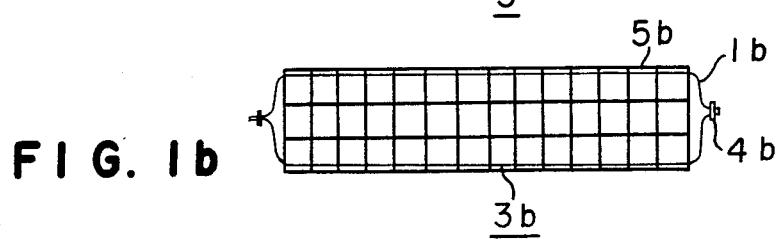
FIG. 1b is a front view of another embodiment of the hydration-expansive crushing cartridge.

When the body to be crushed is bored deeply, the hydration-expansive crushing cartridge to be charged in it becomes longer. Therefore, the hydration-expansive cartridge 3b is covered by a net 5b on the outer face of the container 1b so as to reinforce the hydration-expansive crushing cartridge as shown in FIG. 1b.

4 and 4b designates sealings with which the container 1 or 1b is closed after the hydration-expansive crushing agent is charged in the container.

Figure 2:
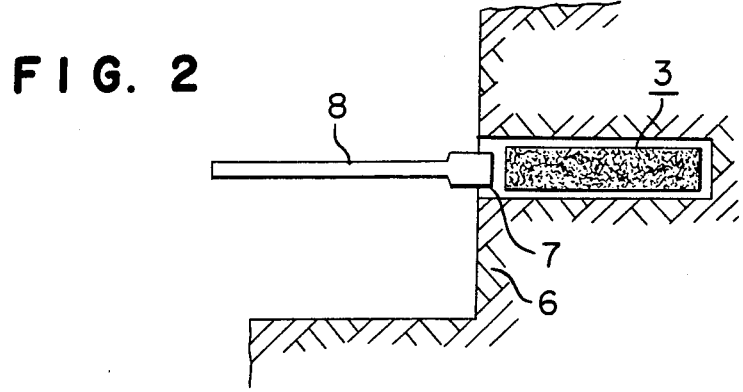
FIGS. 2 and 3 are cross sectional views for the explanation of the charging state of an embodiment of the hydration-expansive crushing cartridges onto bored holes of concrete structures.

When the hydration-expansive crushing cartridge of this invention is used, the hydration-expansive crushing cartridge 3 is immersed in water to cause the penetration, invasion or permeation of water into the hydration-expansive cartridge which is then inserted into the hole 7 provided in a concrete structure 6 as shown in FIG. 2. Then, the concrete structure 6 is crushed after a proper time has passed by the hydration-expansive pressure of the hydration-expansive crushing agent 2 contained in the hydration-expansive crushing cartridge. When the hydration-expansive crushing cartridge 3 is charged into the bored hole 7, the charging can be more efficiently carried out by use of a charging rod 8.

Figure 3:
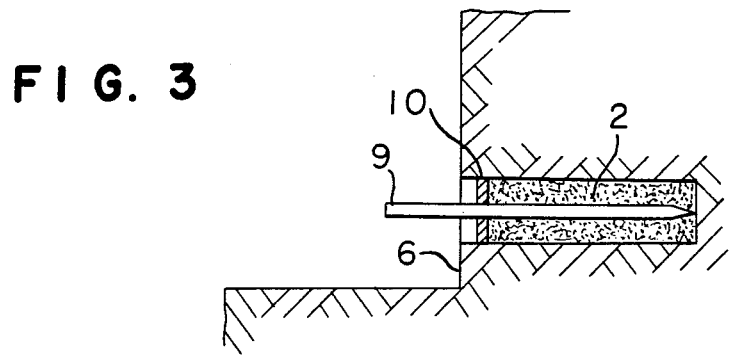

In addition, the crushing in a manner as shown in FIG. 3 in which the hydration-expansive crushing cartridge is pushed into the bored hole 7 by means of a thrusting rod 9 made of concrete after it is immersed in water, can be efficiently effected on the body to be crushed, such as the concrete structure, since the hydration-expansive crushing agent 2 fills the bored hole 7.

It is not necessary to recover the thrusting rod 9 after it has destroyed the hydration-expansive crushing cartridge.

In this case, it is preferable to provide a leakage-preventing ring 10 to prevent leakage of the hydration-expansive crushing agent from the bored hole.

According to the present invention, the hydration-expansive crushing cartridge has a large crushing power and gives a wide crushing area since it can be charged regardless of the positioning or direction of the bored hole provided in the body to be crushed and also with almost no empty space.

Furthermore, it is possible to carry out a continuous working when the hydration-expansive crushing cartridge of this invention is used, from which a homogeneous crushing power with the passage of time is obtained.

Examples of usage of the hydration-expansive crushing cartridge of this invention are further illustrated as follows.

EXAMPLE 1

An expansive cement having the composition of MgO CaO 70 wt%; $(CaO)_2SiO_2$ 25 wt%; and gypsum and $K_2SiF_6$ wt 5% based on the total weight of the compounds in an amount of 300 g was charged as the hydration-expansive crushing agent in a paper bag having a dimension of 35 mm$\phi \times$ 200 mml using a paper of 0.2 mm thickness.

The terminal part was sealed with clips to give a hydration-expansive crushing cartridge.

Thus prepared 6 cartridges were immersed in water for 7 minutes until the generation of gas ceased. The ratio of water to the cement contained in the cartridges was 0.27.

On the other hand, holes having diameters of 36 mm and depths of 200 mm were horizontally bored in a cubic concrete block at positions spaced from one side of the block a distance of 50 mm, which holes were arranged at 50 mm gaps between adjacent holes. Thus resulting respective bored holes were charged with the hydration-expansive crushing cartridges.

Figure 4:
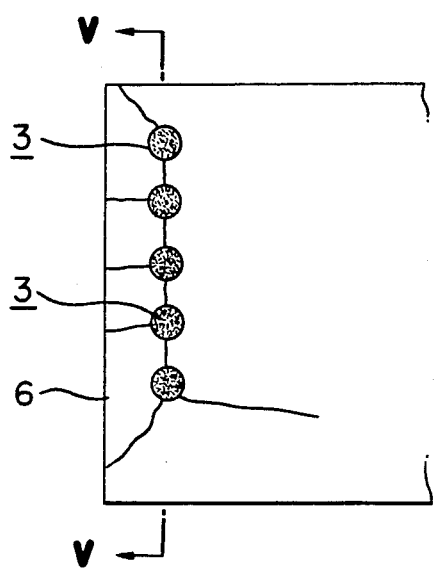
FIG. 4 shows a front view of the state of charging of the hydration-expansive crushing cartridges in the bored holes of the concrete structure and the state of the resulting cracks generated on the concrete structure, which are illustrated in the following Example 1.
Figure 5:
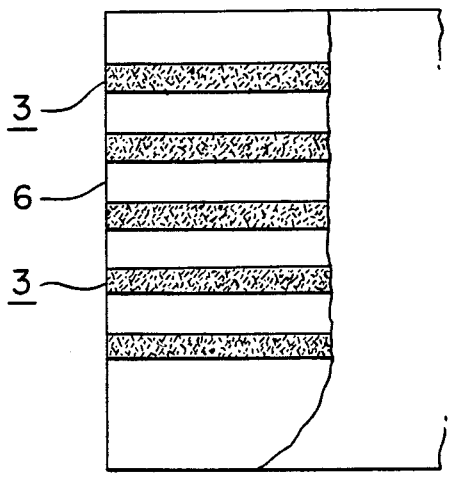
FIG. 5 is a cross sectional view taken along V—V line of FIG. 4.

The charging was carried out by using a charging rod 8 made of wood in the type as shown in FIG. 2. After 40 hours from the charging, cracks were generated as shown in FIGS. 4 and 5. After 5 days concrete pieces peeled off.

EXAMPLE 2

Holes having diameters of 36 mm and depths of 200 mm were bored upwardly in a cubic concrete block on the bottom face at linear positions spaced from one side of the block a distance of 50 mm, at intervals of 50 mm. The same hydration-expansive crushing cartridges as used in the Example 1 were immersed in water for 7 minutes and then charged in the respective bored holes directed upwardly by using thrusting rods made of a concrete and leakage-preventing rings made of a rubber. As the result the concrete block was crushed as in Example 1.

EXAMPLE 3

Holes having diameters of 36 mm and depths of 200 mm were bored downwardly in a cubic concrete block on the top face at linear positions spaced from one side of the block a distance of 50 mm, at intervals of 50 mm. Hydration-expansive crushing cartridges treated by the same procedures as described in Example 1 were charged in the downwardly directing respective bored holes. As the result the concrete block was crushed as in Example 1.

EXAMPLE 4

The identical expansive cement as used in Example 1 was charged in bags made of polyethylene having a thickness of 20$\mu$, which bags had dimensions of 35 mm$\phi \times$ 200 mm length and were provided openings at 5 mm intervals made by pegs, to prepare hydration-expansive crushing cartridges. The resulting cartridges were immersed into water until the generation of gas ceased.

Water penetrated into them for about 6 minutes. These were charged in a concrete block which was bored in the same arrangement as in Example 1. As the result the concrete block was crushed as in Example 1.

EXAMPLE 5

Cylindrical nets having outer diameters of 7 mm and lengths of 180 mm were made of a polystyrene string of diameter of 1 mm.

300 g of the same expansive cement as used in Example 1 was charged in paper bags. The resultant paper bags were inserted into the above stated cylindrical nets, thereby obtaining hydration-expansive crushing cartridges. They were charged into bored holes according to the same procedures as in Example 1. As the result the concrete block was crushed as in Example 1.

The embodiments of the invention in which exclusive property or privilege is claimed are defined as follows:

1. A cartridge adapted to be inserted into a bore hole in a monolithic structure and adapted to expand in said bore hole to cause cracks to be formed in said structure, comprising:

a closed, elongated, tubular casing, said casing being filled with a hydration-expansive agent which is capable of volumetric expansion caused by hydration thereof, said casing being permeable to water while being impermeable to said agent so that when said casing is immersed in water, the water will permeate into the interior of said casing and will wet said agent to cause hydration and expansion thereof while said agent is retained inside said casing, said casing being made of a frangible material which is capable of being punctured by a thrusting rod so that the mixture of said agent and water will flow to fill the bore hole and said agent will expand therein during hydration of said agent and the expansion pressure of said agent as it undergoes hydration will cause cracking of the monolithic structure.

2. A cartridge as claimed in claim 1 in which said agent is a powder of a dry hydraulic cement composition which undergoes volumetric expansion during hydration and setting thereof.

3. A cartridge as claimed in claim 1 in which said casing is made of paper or plastic film.

4. A cartridge as claimed in claim 2 in which said casing is made of paper or plastic film.

5. A cartridge as claimed in claim 1 including a separate reinforcing net disposed inside of or outside of said casing.

6. A cartridge as claimed in claim 2 including a separate reinforcing net disposed inside of or outside of said casing.

7. A cartridge as claimed in claim 3 including a separate reinforcing net disposed inside of or outside of said casing.

8. A cartridge as claimed in claim 4 including a separate reinforcing net disposed inside of or outside of said casing.

9. A cartridge as claimed in claim 2 in which said casing has small holes therethrough so that water can flow into said casing and said hydraulic cement composition is retained within said casing.

10. A method for forming cracks in a monolithic structure, which comprises: boring a bore hole in said structure, immersing a cartridge as claimed in claim 1 in water so that said cartridge is laden with water, then inserting said cartridge in said bore hole and effecting hydration of said agent whereby to cause said agent to expand and to form cracks in said structure.

* * * * *